United States Patent
Szeliski et al.

(10) Patent No.: US 8,121,434 B2
(45) Date of Patent: Feb. 21, 2012

(54) MULTI-PASS IMAGE RESAMPLING

(75) Inventors: Richard Szeliski, Bellevue, WA (US);
Matthew T. Uyttendaele, Seattle, WA (US); Simon Winder, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 12/138,454

(22) Filed: Jun. 13, 2008

(65) Prior Publication Data
US 2009/0310888 A1    Dec. 17, 2009

(51) Int. Cl.
*G06K 9/32* (2006.01)
*G06K 9/40* (2006.01)
*G09G 5/00* (2006.01)

(52) U.S. Cl. .......... 382/298; 382/260; 345/606

(58) Field of Classification Search ....... 345/467–472.3, 345/606–616; 382/298–301, 260–265
See application file for complete search history.

(56) References Cited

U.S. PATENT DOCUMENTS

| | | | |
|---|---|---|---|
| 5,050,225 A * | 9/1991 | Itoh | 382/277 |
| 5,204,944 A | 4/1993 | Wolberg et al. | |
| 5,651,104 A * | 7/1997 | Cosman | 345/428 |
| 5,808,623 A | 9/1998 | Hamburg | |
| 6,061,477 A | 5/2000 | Lohmeyer et al. | |
| 6,442,302 B2 * | 8/2002 | Klassen | 382/296 |
| 6,563,548 B1 | 5/2003 | Shimada | |
| 6,674,430 B1 | 1/2004 | Kaufman et al. | |
| 7,081,895 B2 | 7/2006 | Papakipos et al. | |
| 7,133,041 B2 | 11/2006 | Kaufman et al. | |
| 7,305,034 B2 | 12/2007 | Srinivasan | |
| 7,646,930 B2 * | 1/2010 | Ikeda et al. | 382/254 |
| 7,729,526 B2 * | 6/2010 | George et al. | 382/131 |
| 2005/0114332 A1 | 5/2005 | Lee et al. | |
| 2007/0236505 A1 | 10/2007 | Jung et al. | |

OTHER PUBLICATIONS

Fraser, Avoidance of Additonal Aliasing in Multipass Image Rotations, Nov. 1994, IEEE, vol. 3 No. 6, p. 721-735.*
Xia, Image Registration by "Super Curves", May 2004, IEEE, vol. 13 No. 5, p. 720-732.*
Andreas Gustafsson, "Interactive Image Warping", Helsinki University of Technology, Faculty of Information Technology, Research Papers, May 31, 1993, pp. 1-65.
Fraser, et al., "Avoidance of Additional Aliasing in Multipass Image Rotations", IEEE Transactions on Image Processing, vol. 3, No. 6, Nov. 1994, pp. 721-735.
Watve, et al., "Real Time Image Rotation using Soc Architecture", Proceedings of the Eighth International Symposium on Signal Processing and Its Applications, 2005, vol. 2, Issue , Aug. 28-31, pp. 795-798.
Neil Anthony Dodgson, "Image Resampling", University of Cambridge, Aug. 1992, No. 261, pp. 1-264.

(Continued)

*Primary Examiner* — Aaron W Carter
(74) *Attorney, Agent, or Firm* — Lyon & Harr, LLP; Richard T. Lyon (57) ABSTRACT

Multi-pass image resampling technique embodiments are presented that employ a series of one-dimensional filtering, resampling, and shearing stages to achieve good efficiency while maintaining high visual fidelity. In one embodiment, high-quality (multi-tap) image filtering is used inside each one-dimensional resampling stage. Because each stage only uses one-dimensional filtering, the overall computation efficiency is very good and amenable to graphics processing unit (GPU) implementation using pixel shaders. This embodiment also upsamples the image before shearing steps in a direction orthogonal to the shearing to prevent aliasing, and then downsamples the image to its final size with high-quality low-pass filtering. This ensures that none of the stages causes excessive blurring or aliasing.

20 Claims, 9 Drawing Sheets

OTHER PUBLICATIONS

Bill Triggs, "Empirical Filter Estimation for Subpixel Interpolation and Matching", Proceedings. Eighth IEEE International Conference on Computer Vision, 2001, vol. 2, Issue 2001 pp. 550-557.

Anthony Barkans, "High Quality Rendering Using the Talisman Architecture", Microsoft, 1997, p. 79.

Catmull, et al., "3-D Transformations of Images in Scanline Order", ACM SIGGRAPH Computer Graphics vol. 14, issue 3, 1980, pp. 279-285.

Ewins, et al., "Mip-Map Level Selection for Texture Mapping", IEEE, Transactions on Visualization and Computer Graphics, vol. 4, No. 4, Oct.-Dec. 1998, pp. 317-329.

Greene, et al., "Creating Raster Omnimax Images from Multiple Perspective Views Using the Elliptical Weighted Average Filter.", New York Institute of Technology, IEEE, Jun. 1986, pp. 21-27.

Paul Heckbert, "Survey of Texture Mapping", Computer Graphics and Applications, IEEE, 1986, vol. 6, Issue: 11, pp. 56-67.

Paul Heckbert, "Fundamentals of Texture Mapping and Image Warping", University of California, Berkeley, CA, USA, Jun. 17, 1989, pp. 1-88.

McCormack, et al., "Feline: Fast Elliptical Lines for Anisotropic Texture Mapping", Jun. 2000, Compaq Computer Corporation, pp. 243-250.

Mitcell, et al., "Reconstruction Filters in Computer Graphics", Computer Graphics, vol. 22, No. 4, Aug. 1988, pp. 221-228.

Schilling, et al., "Texram: A Smart Memory for Texturing", IEEE Computer Graphic and Applications, May 1996, pp. 32-41.

Alvy Smith, "Digital Filtering Tutorial for Computer Graphics", Computer Graphics Project, Technical Memo No. 27, Mar. 3, 1983, pp. 1-18.

Michael Unser, "Splines: A Perfect Fit for Signal and Image Processing", IEEE Signal Processing Magazine, Nov. 1999, pp. 22-38.

Lance Williams, "Pyramidal Parametrics", Computer Graphics, vol. 17, No. 3, Jul. 1983, 1-11.

Geusebroek, et al., "Fast anisotropic Gauss filtering", IEEE Transactions on Image Processing, vol. 12, No. 8, Aug. 2003, 938-943.

Unser, et al., "Convolution-Based Interpolation for Fast, High-Quality Rotation of Images", IEEE, Transactions on Image Processing, vol. 4, No. 10, Oct. 1995, pp. 1371-1381.

Jonas Gomes, "Warping and Morphing of Graphical Objects", IMPA, 1997, pp. 1-106.

George Wolberg, "Sampling, Reconstruction and Antialiasing", Chapter 39, Computer Science Handbook, 2004, pp. 1-31.

Thevenaz, et al., "Separable Least-Squares Decomposition of Affine Transformations", Proceedings of the 1997 IEEE International Conference on Image Processing (ICIP'97), Oct. 1997, pp. 1-4.

Hüttner, et al, Fast footprint MIPmapping. In 1999 SIGGRAPH/Eurographics Workshop on Graphics Hardware, pp. 35-44.

* cited by examiner

MULTI-PASS IMAGE RESAMPLING

BACKGROUND

Image resampling, which is sometimes called image warping or texture mapping, is the process of geometrically transforming digital images. One type of image resampling is the multi-pass technique. Multi-pass techniques use multiple one-dimensional image re-scaling and/or shearing passes, combined with filtering of varying quality, to implement image affine image transforms. These techniques, while requiring a significant amount of processing power, result in resampled images exhibiting high visual quality. While processing costs are often a concern, today's central processing unit (CPU) multi-media accelerators and graphics processing units (GPUs) have more than enough power to support multi-pass techniques, especially for applications where visual quality is important, such as photo manipulation, animated slideshows, panoramic image and map viewing, and visual effects.

SUMMARY

Multi-pass image resampling technique embodiments described herein generally involve using one-dimensional filtering stages to achieve high quality results at low computational cost. Using one dimensional resampling enables the use of small resampling kernels, thus producing highly efficiency. These embodiments also ensure that very little aliasing occurs at each stage by upsampling the image during shearing steps in a direction orthogonal to the shearing to prevent aliasing when necessary, and then downsampling the image to its final size along with high-quality low-pass filtering.

In one general four-stage embodiment, the multi-pass image resampling begins with a first pass through the image being resampled. In this first pass a vertical upsampling factor is computed. The vertical upsampling factor represents the degree to which the image is to be upsampled in the vertical direction. It is noted that in computing the vertical upsampling factor a determination is made if the desired horizontal shearing and scaling is likely to cause significant aliasing. If not, no vertical upsampling is necessary, and the vertical upsampling factor can be set to a prescribed value (e.g., 1) that is indicative of the non-aliasing condition. To this end, the image is next upsampled in the vertical direction using the vertical upsampling factor, but only if the vertical upsampling factor does not equal the prescribed value. If the factor equals the prescribed value, the vertical upsampling is skipped. In a second pass through the image, the image is horizontally sheared and scaled in a prescribed manner, which includes employing horizontal filtering. In addition, a horizontal upsampling factor is computed. The horizontal upsampling factor represents the degree to which the image is to be upsampled in the horizontal direction. It is noted in this case that in computing the horizontal upsampling factor a determination is made if the desired vertical shearing and scaling is likely to cause significant aliasing. If not, no horizontal upsampling is necessary, and the horizontal upsampling factor can be set to a prescribed value (e.g., 1) that is indicative of the non-aliasing condition. To this end, the image is next upsampled in the horizontal direction using the horizontal upsampling factor, but only if the horizontal upsampling factor does not equal the prescribed value. If the horizontal factor equals the prescribed value, the horizontal upsampling is skipped.

In a third pass through the image, a low pass filtering is applied to the image in the vertical direction. In addition, if the image was vertically upsampled, it is now vertically downsampling to a prescribed degree. The image is also vertically sheared and scaled in a prescribed manner, which includes employing vertical filtering. Then, in fourth pass through the image, a low pass filtering is applied in the horizontal direction. In addition, if the image was horizontally upsampled, it is now horizontally downsampling to a prescribed degree. The result of the fourth pass is the desired resampled image.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of multi-pass image resampling technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Multi-Pass Image Resampling

The multi-pass image resampling technique embodiments described herein employ a series of one-dimensional filtering stages to achieve good efficiency while maintaining high visual fidelity. In one embodiment, high-quality (multi-tap) image filtering is used inside each one-dimensional resampling stage. Because each stage only uses one-dimensional filtering, the overall computation efficiency is very good and amenable to graphics processing unit (GPU) implementation using pixel shaders. This approach also ensures that none of the stages performs excessive blurring or aliasing, so that the resulting resampled signal contains as much high-frequency detail as possible while avoiding aliasing. In general, this is accomplished by first upsampling the image during shearing steps in a direction orthogonal to the shearing to prevent aliasing, and then downsampling the image to its final size with high-quality low-pass filtering.

The following sections provide a more detailed description of the multi-pass image resampling technique embodiments.

1.1 One-Dimensional Resampling

Figure 1:
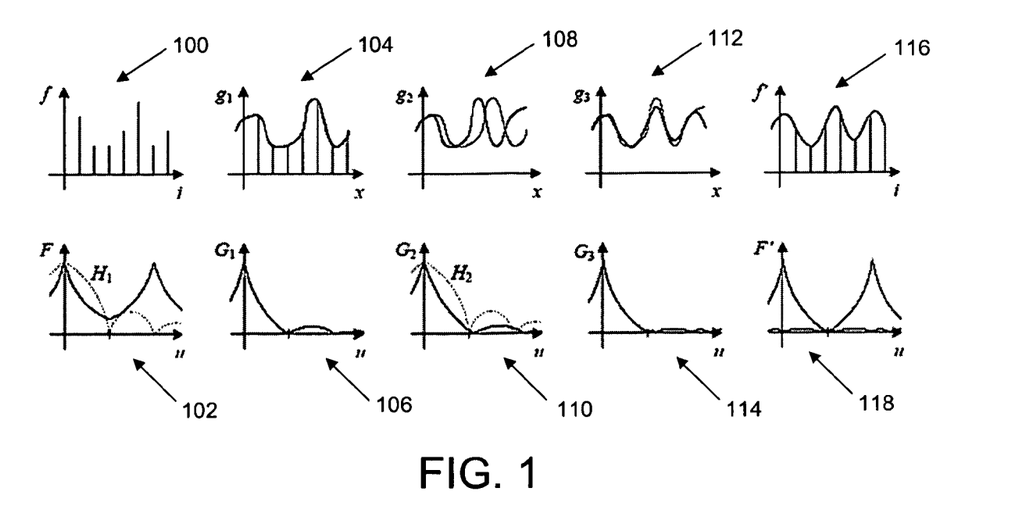
FIG. 1 is a series of graphs showing a progressive one-dimensional signal resampling of a signal, where the signal is shown in the upper row of graphs and the Fourier transform of each signal is shown in a graph just below each signal graph in the second row.

One-dimensional signal resampling can be envisioned using the framework shown in FIG. 1. The original source image (or texture map as the case may be) is represented by a sampled signal f(i), as shown in graph 100. Because the signal is sampled, its Fourier transform is infinitely replicated along the frequency axis. This is show in graph 102 directly below graph 100. To resample the signal, it is first (conceptually) converted into a continuous signal g(x) by convolving it with an interpolation filter, $h_1(x)$, $$g_1(x) = \sum_i f(i)h_1(x-i). \tag{1}$$

The result of this convolution is shown in graph 104. In the frequency domain, this corresponds to multiplying the original signal spectrum $F(u) = \mathscr{F}\{f(x)\}$, with the spectrum of the interpolation filter $H_1(u)$ to obtain:

$$G_1(u) = F(u)H_1(u). \tag{2}$$

The result of this is shown in graph 106.

If the filter is of insufficient quality, phantom replicas of the original spectrum persist in higher frequencies, as shown by the dotted line in graph 106. These replicas correspond to the aliasing introduced during the interpolation process, and are often visible as unpleasant discontinuities (sometimes referred to as jaggies) or motion artifacts (sometimes referred to as crawl).

Examples of interpolation filters include linear interpolation, cubic interpolation and windowed sinc interpolation. In tested embodiments, a raised cosine-weighted sinc filter with 4 cycles (9 taps when interpolating) was employed with success in that it maintains high visual fidelity. Next, a spatial transformation is applied to the original signal domain, e.g., $$x = ax' + t, \tag{3}$$

which is an affine spatial warp where a is a scale factor and t is a translation. Note how the inverse warp is always specified, i.e., the mapping from final pixel coordinates x' to original coordinates x.

The warped or transformed continuous signal and its Fourier transform (in the affine case) are $$g_2(x') = g_1(ax'+t) \Leftrightarrow G_2(u) = \frac{1}{a} G_1(u/a) e^{jut/a}, \tag{4}$$

where j is the imaginary number $j=\sqrt{(-1)}$. For the purpose of an example, assume the original signal is being compressed as shown in graph 108. This causes the Fourier transform to become dilated (stretched) along the frequency axis, as shown in graph 110. Before resampling the warped signal, it is pre-filtered (e.g., using a low-pass filter) by convolving it with another kernel, $$g_3(x) = g_2(x) * h_2(x) \Leftrightarrow G_3(u) = G_2(u)H_2(u). \tag{5}$$

The results of this are shown in graphs 112 and 114. This is particularly necessary if the signal is being minified or decimated, i.e., if a>1 in Eq. (3). If this filtering is not performed carefully, some additional aliasing may be introduced into the final sampled signal (see the dotted line in graph 118).

Fortunately, because of the linearity of convolution operators, the three stages of filtering and warping can be combined into a single composite filter $$H_3(u) = H_1(u/a)H_2(u), \tag{6}$$

which is often just a scaled version of the original interpolation filter $h_1(x)$. For ideal (sinc) reconstruction and low-pass filtering, the Fourier transform is a box filter of the smaller width, and hence the combined filter is itself a sinc (of larger width). The final discrete convolution can be written as $$f'(i) = g_3(i) \tag{7}$$
$$= \sum_j h_3(ai+t-j)f(j)$$
$$= \sum_j h([ai+t-j]/s)f(j),$$

where s=max(1, |a|). where here j refers to the summation index that ranges over all of the pixels (samples) that have non-zero support in the function $h_3([ai+t-j]/s)$. The results of this are shown in graph 116 and it associated spectra graph 118.

The filter in Eq. (7) is a polyphase filter, since the filter coefficients being multiplied with the input signal f(j) are potentially different for every output value of i. To see this, Eq. (7) can be rewritten as $$f'(i) = \sum_j h([ai+t-j]/s)f(j) = \sum_j h_P(j^*-j; \phi)f(j), \tag{8}$$

where $j^* = \lfloor ai+t \rfloor$, $\phi = ai+t-j^*$, and $h_P(k;\phi) = h([k+\phi]/s)$, where k and $\phi$ are the free parameters inside the definition of $h_P$. The values in $h(k;\phi)$ can be precomputed for a given value of s and stored in a two-dimensional look-up table if desired. In one embodiment, the values of $h(k;\phi)$ are re-normalized so that $\Sigma_k h(k; \phi) = 1$. The number of discrete fractional values of $\phi$ is related to the desired precision of the convolution, and is typically $2^b$, where b is the number of bits of desired precision in the output (e.g., say 10-bits for 8-bit RGB images to avoid error accumulation in multi-pass transforms). Eq. (7) can be written in a functional form as $$f' = \mathcal{H}(f;h,s,a,t). \qquad (9)$$

In other words, $\mathcal{H}$ is an algorithm, parameterized by a continuous filter kernel h(x), scale factors s and a, and a translation t, which takes an input signal f(i) and produces an output signal f'(i). This operator is generalized in the next section to a pair of horizontal and vertical scale/shear operators.

1.2 Two-Dimensional Zooming

Two-pass separable transforms are accomplished by first resampling the image horizontally and then resampling the resulting image vertically (or vice-versa). These operations can be performed by extending the above-described one-dimensional resampling operator of Eq. (9) to a pair of horizontal and vertical image resampling operators, $$f' = \mathcal{H}_h(f, h, s, a_0, a_1, t) \Leftrightarrow \qquad (10)$$
$$f'(i, j) = \sum_k h(s[a_0 i + a_1 j + t - k]) f(k, j)$$

and $$f' = \mathcal{H}_v(f, h, s, a_0, a_1, t) \Leftrightarrow \qquad (11)$$
$$f'(i, j) = \sum_k h(s[a_1 t + a_0 j + t - k]) f(i, j).$$

Note that these operators not only support directional scaling and translation, but also support shearing (i.e., using a different translation for each row or column), which is used for more complex transformations. Image minification (zooming out) can be made more efficient using mipmaps or ripmaps as will be described in more detail later.

1.3 Shearing

In a simplified case of a pure horizontal shear, $$\begin{bmatrix} x \\ y \end{bmatrix} = \begin{bmatrix} a_0 & a_1 & t \\ 0 & 1 & 0 \end{bmatrix} \begin{bmatrix} x' \\ y' \\ 1 \end{bmatrix} \qquad (12)$$

This corresponds to a general implementation of $\mathcal{H}_h$ with $a_1 \neq 0$.

In the frequency domain (ignoring the effect of the translation parameter t, since it does not affect aliasing), this corresponds to a transformation of $$u' = A^T u \text{ where } A^T = \begin{bmatrix} a_0 & 0 \\ a_1 & 1 \end{bmatrix}. \qquad (13)$$

Thus, it can be seen that a horizontal shear in the spatial domain induces a vertical shear in the frequency domain. This can lead to aliasing. However, upsampling the signal vertically first can ameliorate the aliasing effect. Notice how the original frequency $(\pm 1, \pm 1)$ gets mapped to $(\pm a_0, \pm 1 \pm a_1)$, which can be beyond the vertical Nyquist frequency. It is noted that from here on the convention that the frequencies range over $[-1,+1]$ will be used to simplify the notation.

In order to avoid aliasing, a three phase approach is implemented for the horizontal case, which generally includes:
1. upsampling vertically by the factor $r \geq 1 + |a_1|$;
2. shearing and scaling horizontally, with filtering to avoid aliasing; and
3. low-pass filtering and downsampling vertically.

Figure 2:
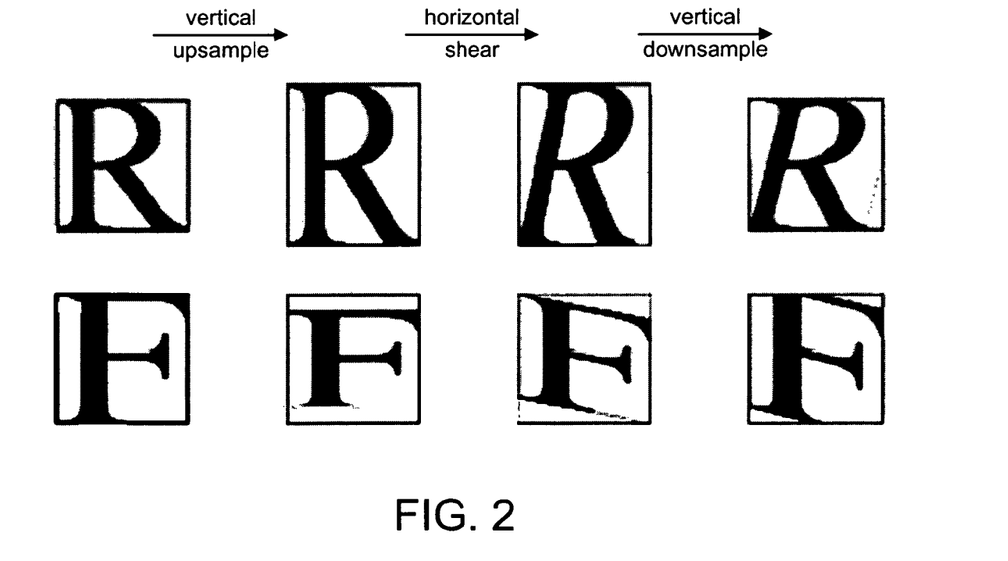
FIG. 2 is a series of images showing a progressive horizontal resampling, where the top row depicts the image as it undergoes (from left to right) vertical upsampling, then horizontal shear and finally vertical downsampling. The bottom row represents the Fourier transform of the image just above it.

In terms of geometric transformation, this corresponds to factoring $$A = \begin{bmatrix} 1 & 0 \\ 0 & 1/r \end{bmatrix} \begin{bmatrix} a_0 & a_1/r \\ 0 & 1 \end{bmatrix} \begin{bmatrix} 1 & 0 \\ 0 & r \end{bmatrix} = A_1 A_2 A_3, \qquad (14)$$

and applying the sequence of transformations $$x = A_1 x_1, x_1 = A_2 x_2, x_2 = A_3 x', \qquad (15)$$

as shown in FIG. 2, where the top row depicts the image and the bottom row represents the Fourier transform of the image (i.e. its frequency spectra). Note that the frequency spectra are scaled to a unit square with maximum frequencies $(\pm 1, \pm 1)$ in order to make the upsampling and downsampling more intuitive. The left-most column in FIG. 2, corresponds to the original image. The second column from the left corresponds to the image after undergoing vertical upsampling, the third column from the left corresponds to the image after additionally undergoing horizontal shearing, and the right-most column corresponds to the image after undergoing vertical downsampling.

The transpose of the middle matrix $A_2$ is $$A_2^T = \begin{bmatrix} a_0 & 0 \\ a_1/r & 1 \end{bmatrix}, \qquad (16)$$

which when multiplied by the maximum frequency present in the upsampled signal, $(\pm 1, \pm 1/r)$ still lies inside the Nyquist range $u' \in [-1, +1]^2$ (after horizontal filtering, which is applied during the scale/shear).

In the aforementioned operational notation, this can be written as $$f_1 = \mathcal{H}_v(f, h, 1, 1/r, 0, 0); \qquad (17)$$

$$f_2 = \mathcal{H}_h(f_1, h, \max(1, |a_0|), a_0, a_1/r, t); \text{ and} \qquad (18)$$

$$f_3 = \mathcal{H}_v(f_2, h, r, r, 0, 0). \qquad (19)$$

It is noted that the upsampling rate can get arbitrarily high as $|a_1| \gg 1$. However, in practice, the maximum upsampling rate need never exceed r=3 as some high horizontal frequencies do not appear in the final image, and can therefore be filtered away during the horizontal shear. To compute a value for r, the maximum values of the original frequencies that will appear in the final image $(u_{max}, v_{max})$ are determined first. The value of $v_{max}$ can be less than 1 if the general form of a shear matrix with vertical scaling included is considered, i.e., $$A = \begin{bmatrix} a_{00} & a_{01} \\ 0 & a_{11} \end{bmatrix} = \begin{bmatrix} 1 & 0 \\ 0 & a_{11}/r \end{bmatrix} \begin{bmatrix} a_{00} & a_{01}/r \\ 0 & 1 \end{bmatrix} \begin{bmatrix} 1 & 0 \\ 0 & r \end{bmatrix}, \qquad (20)$$

Eq. (20) combines the vertical scaling with the initial vertical resampling stage. To avoid aliasing, it should be ensured that $$A_2^T \begin{bmatrix} \pm u_{max} \\ \pm a_{11}v_{max}/r \end{bmatrix} = \begin{bmatrix} \pm a_{00}u_{max} \\ \pm a_{01}u_{max}/r \pm a_{11}v_{max}/r \end{bmatrix} \quad (21)$$

lies within the bounding box $[-1,+1]^2$. In other words, that $|a_{01}|u_{max}/r+|a_{11}|v_{max}/r \leq 1$ or $r \geq |a_{01}|u_{max}+|a_{11}|v_{max}$. Whenever $|a_{11}|v_{max}>1$, this value can be clamped to 1, since there is no need to further upsample the signal. When the vertical scaling $a_{11}$ is sufficiently small (magnification), $r<1$. With $r<1$, there is no risk of aliasing during the horizontal shear. As such, r is set to 1 and the final vertical downsampling stage is dropped. The equation for r can thus become, $$r \geq \max(1, |a_{01}|u_{max} + \min(1, |a_{11}|v_{max})). \quad (22)$$

The final three (or two as the case may be) stage horizontal resampling is therefore:

$$f_1 = \mathscr{R}_v(f, h, 1/v_{max}, a/r, 0, 0); \quad (23)$$

$$f_2 = \mathscr{R}_h(f_1, h, \max(1, |a_{00}|), a_{00}, a_{01}/r, t); \text{ and} \quad (24)$$

$$f_3 = \mathscr{R}_v(f_2, h, r, r, 0, 0). \quad (25)$$

where the last stage is skipped if $r=1$.

The vertical resampling results in a similar three (or two as the case may be) stage resampling.

1.4 The General Affine Case

Any 2D affine transform can be decomposed into two shear operations. For example, if the horizontal shear is performed first, $$A = \begin{bmatrix} a_{00} & a_{01} & t_0 \\ a_{10} & a_{11} & t_1 \\ 0 & 0 & 1 \end{bmatrix} = \begin{bmatrix} b_0 & b_1 & t_2 \\ 0 & 1 & 0 \\ 0 & 0 & 1 \end{bmatrix} \begin{bmatrix} 1 & 0 & 0 \\ a_{10} & a_{11} & t_1 \\ 0 & 0 & 1 \end{bmatrix}, \quad (26)$$

with $b_0 = a_{00} - a_{01}a_{10}/a_{11}$, $b_1 = a_{01}/a_{11}$, and $t_2 = t_0 - a_{01}t_1/a_{11}$. Notice that Eq. (26) becomes degenerate as $a_{11} \to 0$, which is a symptom of a so-called bottleneck problem. Fortunately, it is possible to transpose the input (or output) image and adjust the transform matrix accordingly. To determine whether to transpose the image, the first two rows of A are first re-scaled into unit vectors, $$\hat{A} = \begin{bmatrix} \hat{a}_{00} & \hat{a}_{01} \\ \hat{a}_{10} & \hat{a}_{11} \end{bmatrix} = \begin{bmatrix} a_{00}/l_0 & a_{01}/l_0 \\ a_{10}/l_1 & a_{11}/l_1 \end{bmatrix}, \quad (27)$$

where $l_i = \sqrt{a_{i0}^2 + a_{i1}^2}$. The absolute cosines of these vectors with the x and y axes are then computed, $|\hat{a}_{00}|$ and $|\hat{a}_{11}|$, and compared to the absolute cosines with the transposed axes, i.e., $|\hat{a}_{01}|$ and $|\hat{a}_{10}|$. Whenever $|\hat{a}_{00}|+|\hat{a}_{11}|<|\hat{a}_{01}|+|\hat{a}_{10}|$, the image is transposed prior to resampling. If the input image is transposed, the output image is also transposed.

Having developed a three-pass transform for each of the two shears, it would be possible to concatenate these to obtain a six-pass separable general affine transform. However, it is possible to collapse some of the shears and subsequent upsampling or downsampling operations to obtain a four-pass transform. This is accomplished by performing the horizontal upsampling needed for later vertical shearing at the same time as the original horizontal shearing. In a similar vein, the vertical downsampling is performed in the same pass as the vertical shearing and scaling. This four-pass (stage) approach is illustrated shown in FIG. 3 using the example of a rotation, where the top row depicts the image and the bottom row represents the Fourier transform of the image (i.e. its frequency spectra). The left-most column in FIG. 3, corresponds to the original image. The second column from the left corresponds to the image after undergoing vertical upsampling, the third column from the left corresponds to the image after additionally undergoing horizontal shearing and horizontal upsampling, the fourth column from the left corresponds to the image after next undergoing vertical shearing and vertical downsampling and the right-most column corresponds to the image after undergoing horizontal downsampling.

Figure 3:
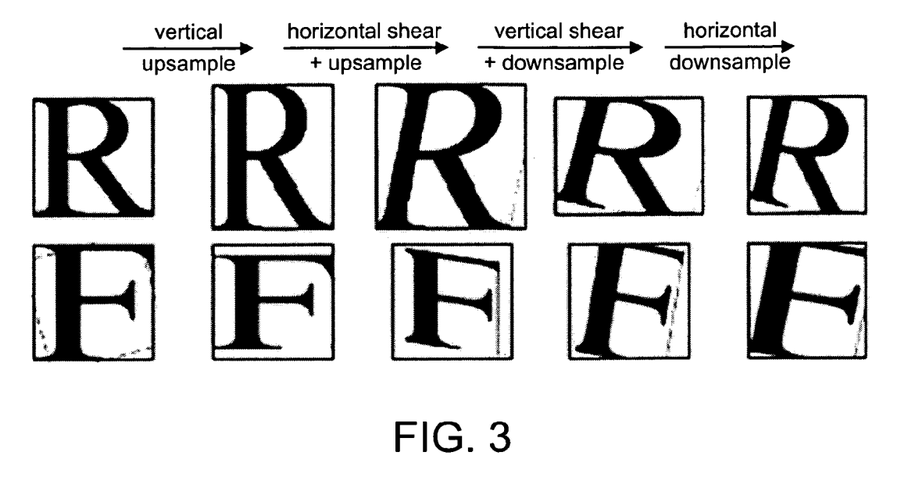
FIG. 3 is a series of images showing a progressive four-pass horizontal resampling, where the top row depicts the image as it undergoes (from left to right) vertical upsampling, then horizontal shear and horizontal upsampling, then vertical shear and vertical downsampling, and finally horizontal downsampling. The bottom row represents the Fourier transform of the image just above it.

In terms of geometric transformations, this four stage approach corresponds to a factorization of the form, $$A = \begin{bmatrix} 1 & 0 & 0 \\ 0 & a_{11}/r_v & 0 \\ 0 & 0 & 1 \end{bmatrix} = \begin{bmatrix} b_0/r_h & a_{01}/r_v & t_2 \\ 0 & 1 & 0 \\ 0 & 0 & 1 \end{bmatrix} \quad (8)$$

$$\begin{bmatrix} 1 & 0 & 0 \\ a_{10}r_v/(a_{11}r_h) & r_v & t_1r_v/a_{11} \\ 0 & 0 & 1 \end{bmatrix} \begin{bmatrix} r_h & 0 & 0 \\ 0 & 1 & 0 \\ 0 & 0 & 1 \end{bmatrix}.$$

Figure 4:
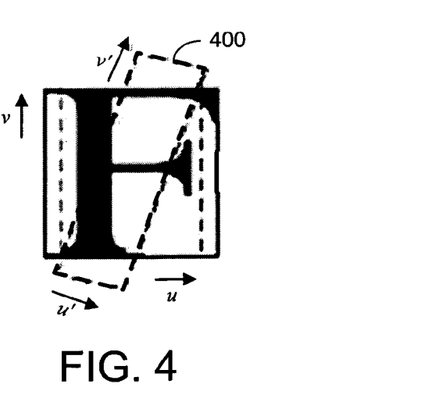
FIGS. 4 and 5 are images geometrically illustrating how $u_{max}$ and $v_{max}$ values are determined.
Figure 5:
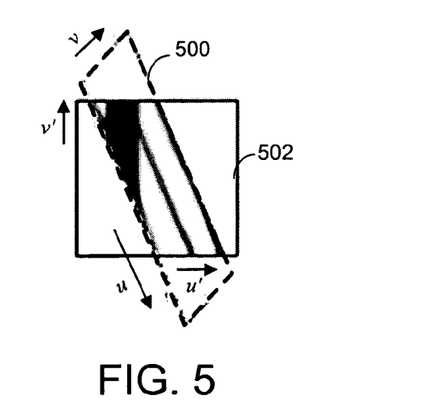

In order to compute the appropriate values for $r_v$ and $r_h$, it is first determined which frequency in the original image needs to be preserved in the final image. Frequencies that get mapped completely outside the final spectrum can be pre-filtered away during the upsampling stages, thereby reducing the total number of samples generated. To compute the values of $(u_{max}, v_{max})$, the corners of the final spectrum at $u'=(\pm 1, \pm 1)$ is first projected into the original spectrum through $u = A^{-T}u'$, to obtain the dashed parallelogram 400 shown in FIG. 4. A standard polygon intersection technique is then used to compute the intersection of this parallelogram with the unit square. The horizontal and vertical extents of the resulting polygon define the values of $(u_{max}, v_{max})$. For example, in FIG. 5, the value of $u_{max}$ can be read off from the intersection point of the parallelogram 500 with the top and bottom sides of the square 502.

Once the $(u_{max}, v_{max})$ extents are known, the upsampling rates are computed using $$r_v \geq \max(1, |a_{01}|u_{max} + \min(1, |a_{11}|v_{max})) \text{ and} \quad (29)$$

$$r_h \geq \max(1, |a_{10}/a_{11}|r_v v_{max} + \min(1, |b_0|u_{max})). \quad (30)$$

The final four-stage approach is therefore:

$$f_1 = \mathscr{R}_v(f, h, 1/v_{max}, a_{11}/r_v, 0, t_1); \quad (31)$$

$$f_2 = \mathscr{R}_h(f_1, h, 1/u_{max}, b_0/r_h, a_{01}/r_v, t_2); \quad (32)$$

$$f_3 = \mathscr{R}_h(f_2, h, r_v, r_v, a_{10}r/(a_{11}r_h), 0); \quad (33)$$

$$f_4 = \mathscr{R}_h(f_3, h, r_h, r_h, 0, 0). \quad (34)$$

Figure 6A:
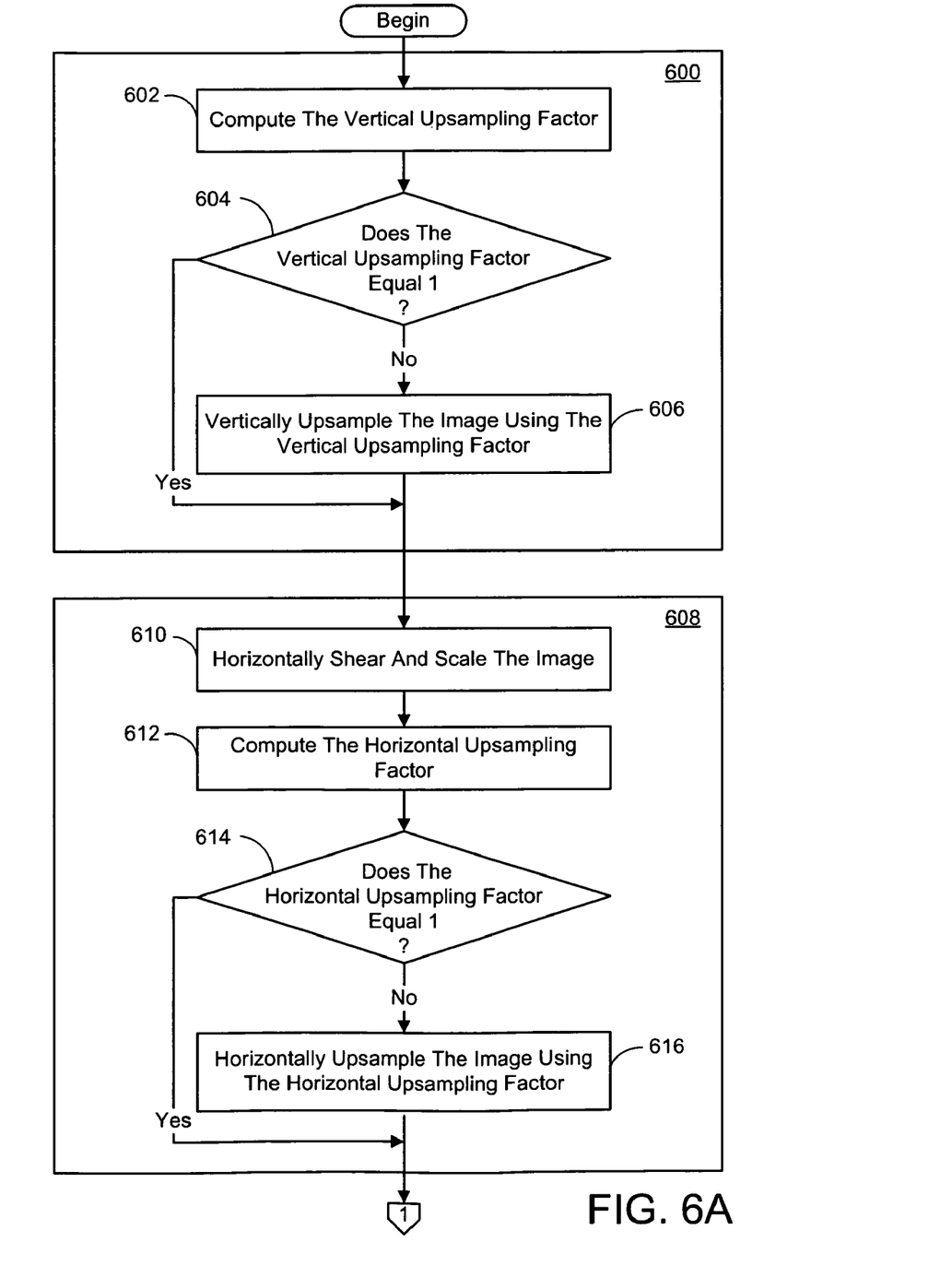
FIGS. 6A-B are a continuing flow diagram generally outlining one embodiment of a process for multi-pass image resampling involving four passes through the image with horizontal shearing and scaling coming before vertical shearing and scaling.
Figure 6B:
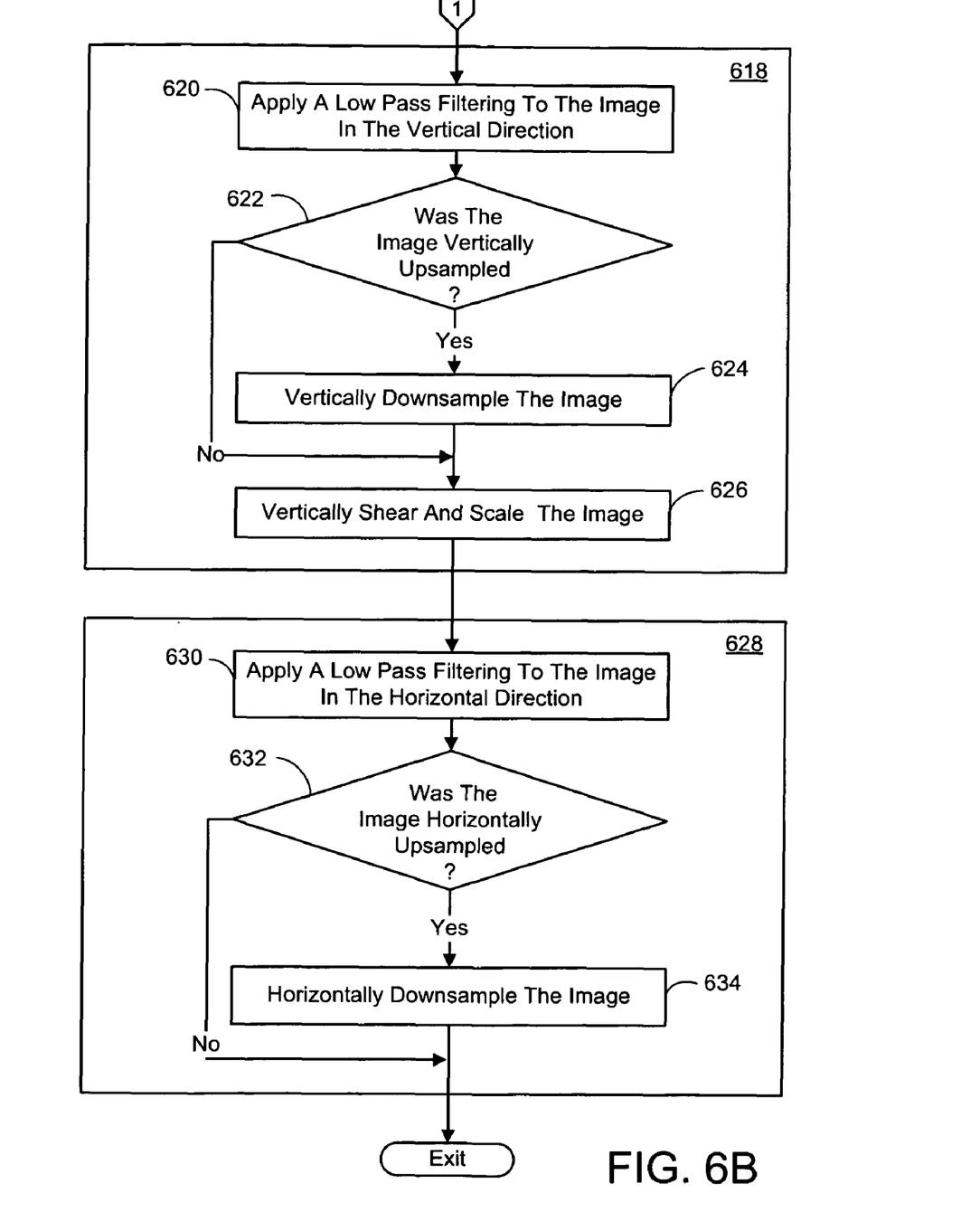

An exemplary process implementing the foregoing multi-pass image resampling embodiments involving four passes through the image is shown in FIGS. 6A-B. The process begins with a first pass 600 through the image being resampled and involves computing the aforementioned vertical upsampling factor (602). It is then determined if the vertical upsampling factor is equal to 1 (604). If not, the image is then upsampled in the vertical direction using the vertical upsampling factor (606). If the vertical upsampling factor is equal to 1, the vertical upsampling is skipped. Next, in a second pass 608 through the image, the image is horizontally sheared and scaled in a prescribed manner which includes employing horizontal filtering (610). In addition, the aforementioned horizontal upsampling factor is computed (612). It is then determined if the horizontal upsampling factor is equal to 1 (614). If not, the image is upsampled in the horizontal direction using the horizontal upsampling factor (616). If the horizontal upsampling factor is equal to 1, the horizontal upsampling is skipped.

In a third pass 618 through the image, a low pass filtering is applied to the image in the vertical direction (620). In addition, it is determined if the image was vertically upsampled (622). If so, the image is vertically downsampled to a prescribed degree (624). The image is also vertically sheared and scaled in a prescribed manner, which includes employing vertical filtering (626). Then in fourth pass 628 through the image, a low pass filtering is applied in the horizontal direction (630). In addition, it is determined if the image was horizontally upsampled (632). If so, the image is horizontally downsampled to a prescribed degree (634). The result is the resampled image.

1.5 Mipmaps and Ripmaps

As indicated previously, the use of mipmaps or ripmaps can increase processing efficiency. Mipmaps are a set of pre-computed images depicting the same scene as an associated full-resolution image, but which represent progressively lower resolution images each exhibiting a reduced level of detail in comparison to the preceding image. In mipmaps, the reduction in detail is isotropic in that the reduction is the same in every direction. Ripmaps are a set of progressively lower resolution images similar to mipmaps except the degree in the reduction of detail is not the same in all directions. In cases where the resampling involves a large degree of minification in a particular direction, the processing required for implementing the multi-pass image resampling technique embodiments described herein can be significantly reduced by using an appropriate mipmap or ripmap image that is closer to the desired scale of the output image as the input image, rather that the aforementioned full resolution image. To this end, the mipmap or ripmap closest to but still having a higher resolution that the desired output image would be chosen as the input image.

Figure 7A:
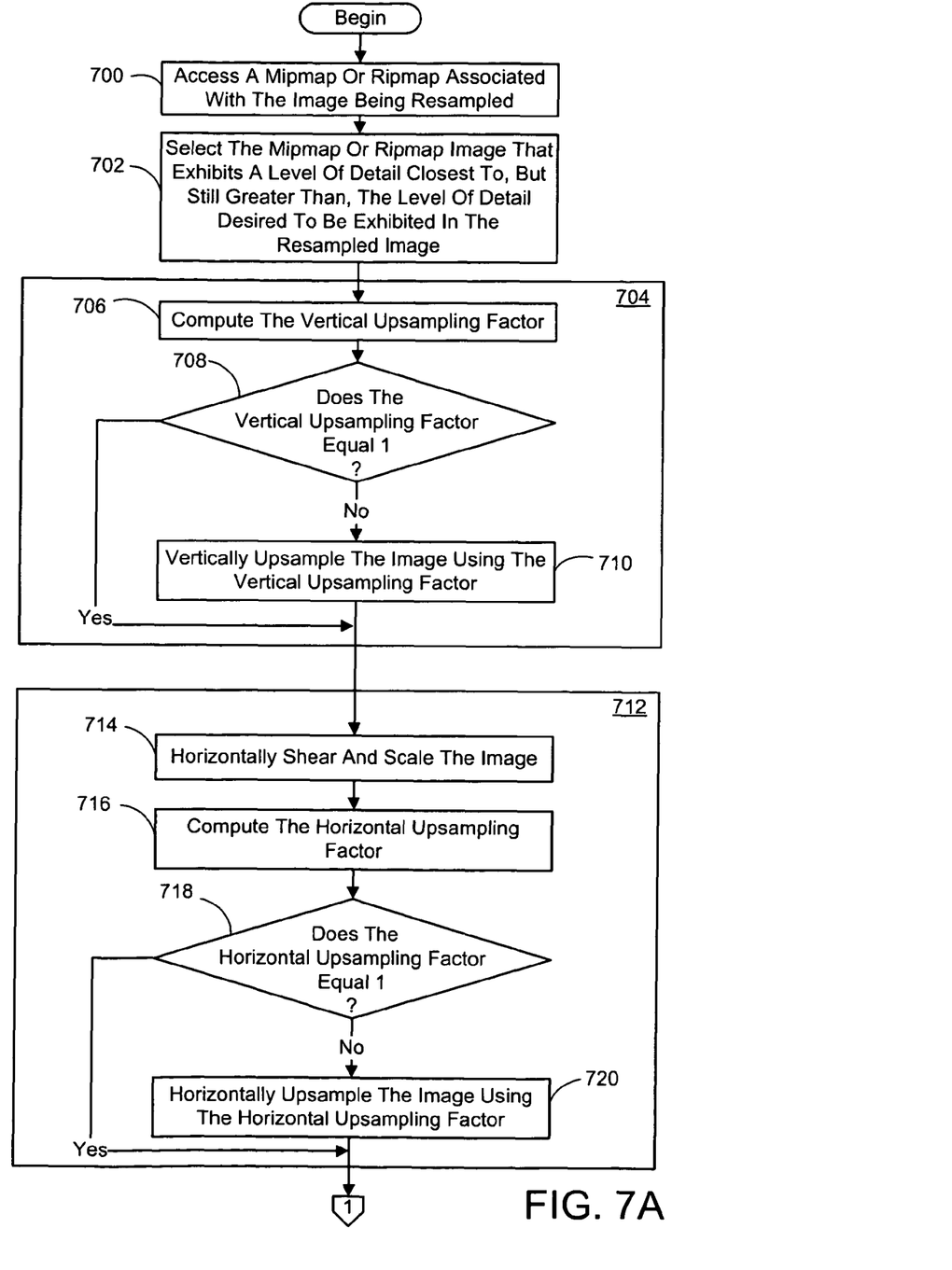
FIGS. 7A-B are a continuing flow diagram generally outlining one embodiment of a process for multi-pass image resampling involving four passes through an image selected from a mipmap or ripmap.
Figure 7B:
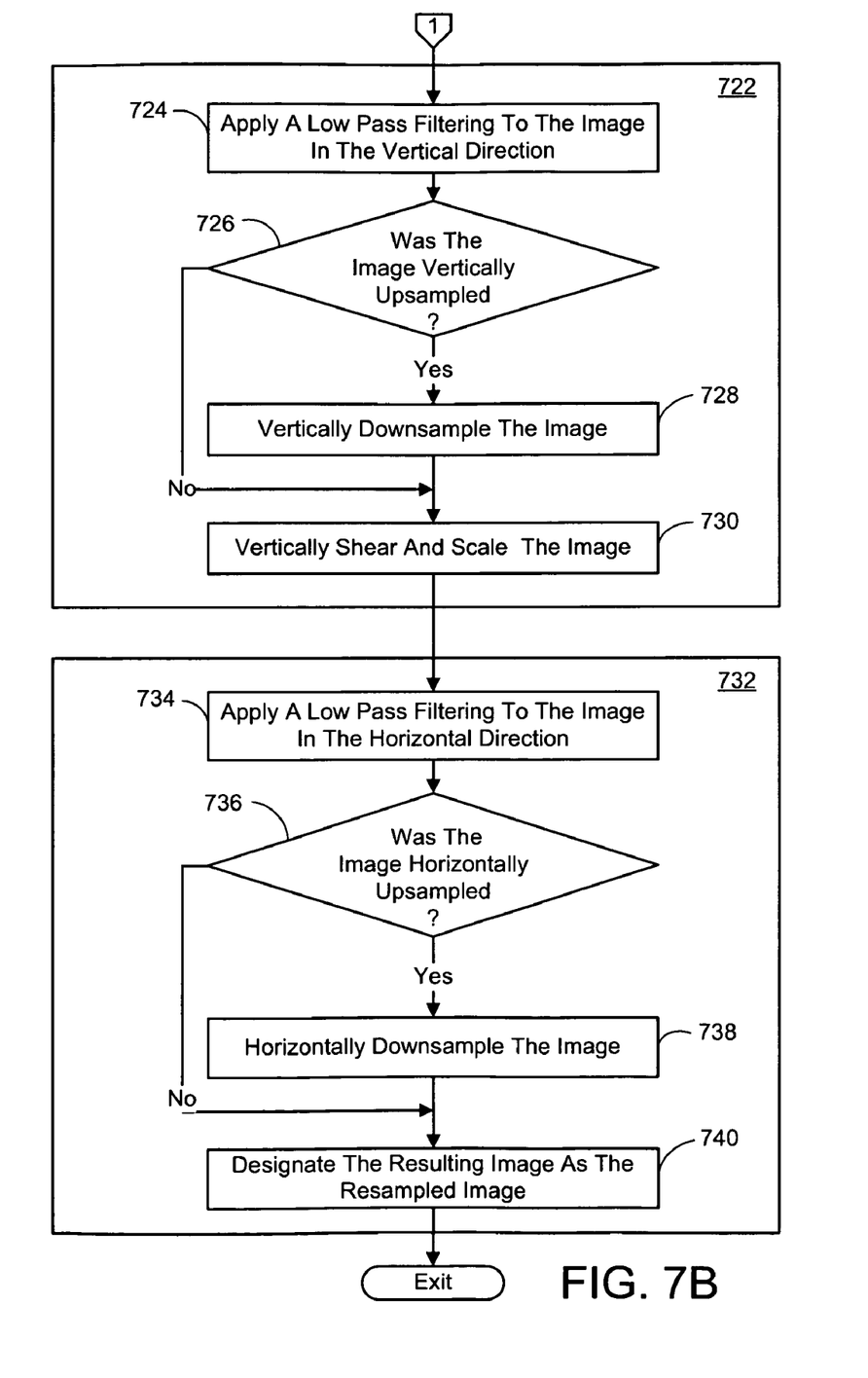

An exemplary process implementing the foregoing multi-pass image resampling embodiments employing mipmaps or ripmaps is shown in FIGS. 7A-B. The process begins with accessing a mipmap or ripmap associated with the image being resampled (700) and selecting the image from the accessed mipmap or ripmap which exhibits a level of detail closest to, but still greater than, the level of detail desired to be exhibited in the resampled image (702). Then, in a first pass 704 through the selected image, the aforementioned vertical upsampling factor is computed (706). It is then determined if the vertical upsampling factor is equal to 1 (708). If not, the selected image is then upsampled in the vertical direction using the vertical upsampling factor (710). If the vertical upsampling factor is equal to 1, the vertical upsampling is skipped. Next, in a second pass 712 through selected image, the image is horizontally sheared and scaled in a prescribed manner which includes employing horizontal filtering (714). In addition, the aforementioned horizontal upsampling factor is computed (716). It is then determined if the horizontal upsampling factor is equal to 1 (718). If not, the selected image is upsampled in the horizontal direction using the horizontal upsampling factor (720). If the horizontal upsampling factor is equal to 1, the horizontal upsampling is skipped.

In a third pass 722 through the selected image, a low pass filtering is applied in the vertical direction (724). In addition, it is determined if the selected image was vertically upsampled (726). If so, the selected image is vertically downsampled to a prescribed degree (728). The selected image is also vertically sheared and scaled in a prescribed manner, which includes employing vertical filtering (730). Then in fourth pass 732 through the selected image, a low pass filtering is applied in the horizontal direction (734). In addition, it is determined if the selected image was horizontally upsampled (736). If so, the selected image is horizontally downsampled to a prescribed degree (738). The result is then designated as the resampled image (740).

2.0 Other Embodiments

Figure 8A:
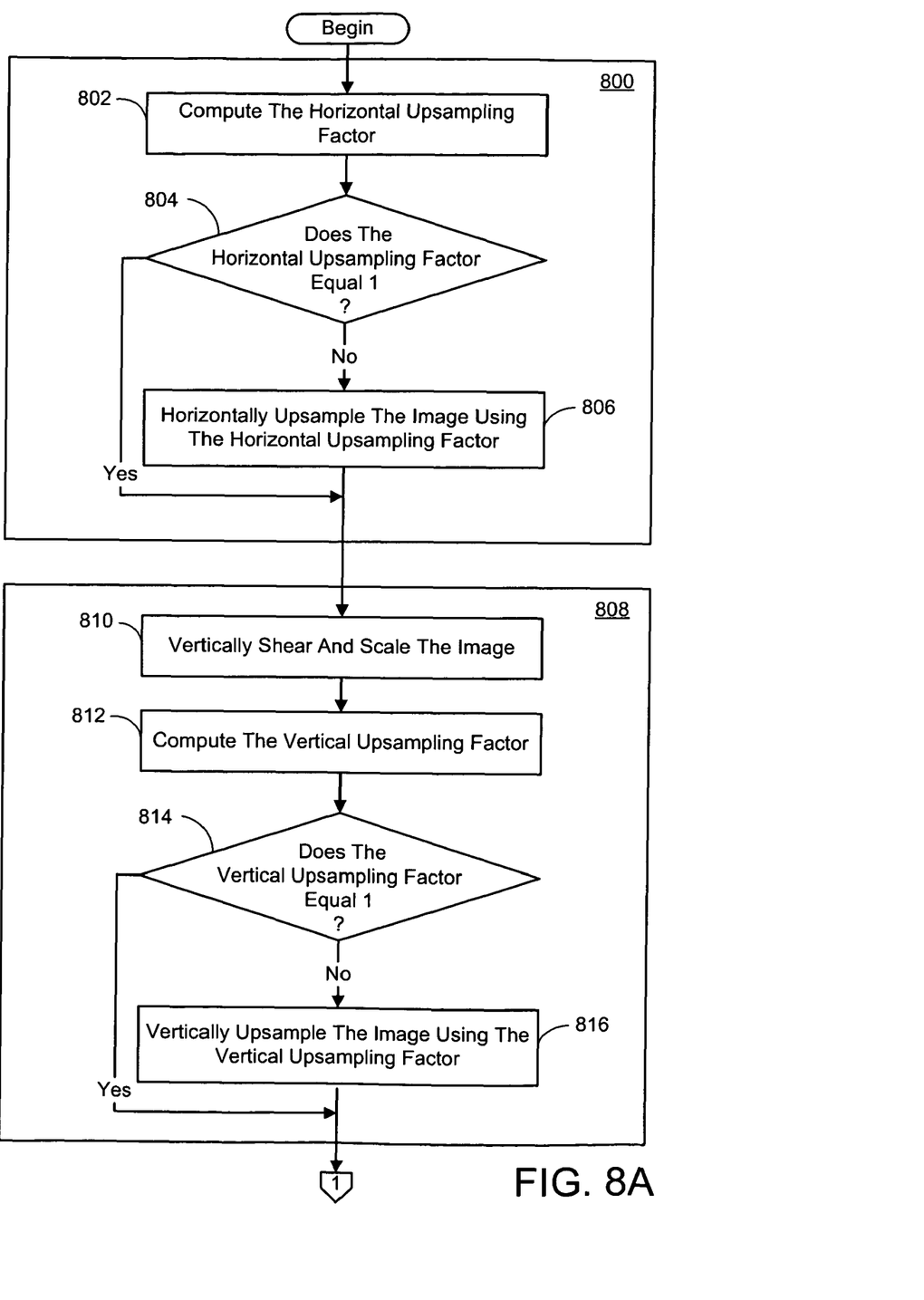
FIGS. 8A-B are a continuing flow diagram generally outlining another embodiment of a process for multi-pass image resampling involving four passes through the image with vertical shearing and scaling coming before horizontal shearing and scaling.
Figure 8B:
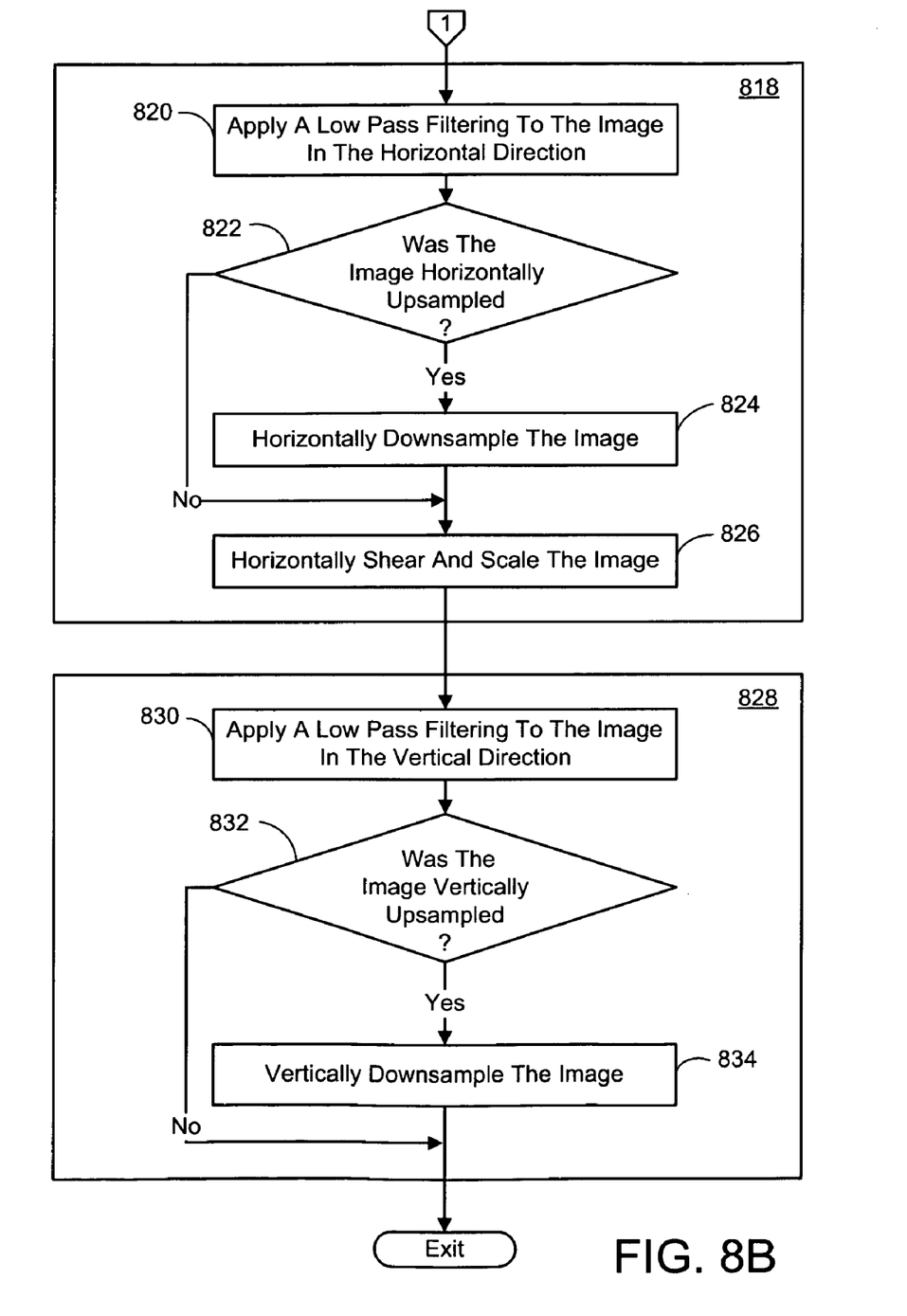

Although the multi-pass image resampling technique embodiments described previously performed horizontal shearing and scaling, before the vertical shearing and scaling, this need not be the case. This sequence can be reversed such that the vertical shearing and scaling occurs first, followed by the horizontal shearing and scaling. An exemplary process implementing the foregoing reversed multi-pass image resampling embodiment is shown in FIGS. 8A-B. The process begins with a first pass 800 through the image being resampled and involves computing the aforementioned horizontal upsampling factor (802). It is then determined if the horizontal upsampling factor is equal to 1 (804). If not, the image is then upsampled in the horizontal direction using the horizontal upsampling factor (806). If the horizontal upsampling factor is equal to 1, the horizontal upsampling is skipped. Next, in a second pass 808 through the image, the image is vertically sheared and scaled in a prescribed manner which includes employing vertical filtering (810). In addition, the aforementioned vertical upsampling factor is computed (812). It is then determined if the vertical upsampling factor is equal to 1 (814). If not, the image is upsampled in the vertical direction using the vertical upsampling factor (816). If the vertical upsampling factor is equal to 1, the vertical upsampling is skipped.

In a third pass 818 through the image, a low pass filtering is applied to the image in the horizontal direction (820). In addition, it is determined if the image was horizontally upsampled (822). If so, the image is horizontally downsampled to a prescribed degree (824). The image is also horizontally sheared and scaled in a prescribed manner, which includes employing horizontal filtering (826). Then in fourth pass 828 through the image, a low pass filtering is applied in the vertical direction (830). In addition, it is determined if the image was vertically upsampled (832). If so, the image is vertically downsampled to a prescribed degree (834). The result is the resampled image.

It further noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

3.0 The Computing Environment

A brief, general description of a suitable computing environment in which portions of the multi-pass image resampling technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 9:
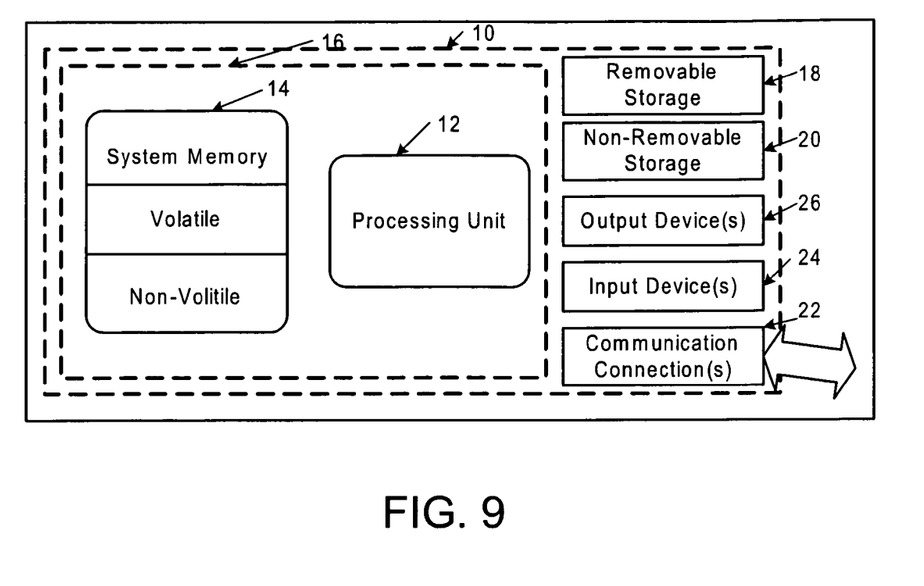
FIG. 9 is a diagram depicting a general purpose computing device constituting an exemplary system for implementing multi-pass image resampling technique embodiments described herein.

FIG. 9 illustrates an example of a suitable computing system environment. The computing system environment is only one example of a suitable computing environment and is not intended to suggest any limitation as to the scope of use or functionality of multi-pass image resampling technique embodiments described herein. Neither should the computing environment be interpreted as having any dependency or requirement relating to any one or combination of components illustrated in the exemplary operating environment. With reference to FIG. 9, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 9 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 9 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The multi-pass image resampling technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

Wherefore, what is claimed is:

1. A computer-implemented process for multi-pass resampling of a digital image, comprising using a computer to perform the following process actions:

in a first pass through the image,
computing a vertical upsampling factor representing the degree to which the image is to be upsampled in the vertical direction, wherein the vertical upsampling factor is set to a prescribed value whenever there is no substantial possibility of horizontal aliasing during said resampling of the image, and
upsampling the image in the vertical direction by said vertical upsampling factor, whenever said vertical upsampling factor does not equal said prescribed value;

in a second pass through the image,
horizontally shearing and scaling the image in a prescribed manner employing a horizontal filtering,
computing a horizontal upsampling factor representing the degree to which the image is to be upsampled in the horizontal direction, wherein the horizontal upsampling factor is set to a prescribed value whenever there is no substantial possibility of vertical aliasing during said resampling of the image, and
upsampling the image in the horizontal direction by said horizontal upsampling factor, whenever said horizontal upsampling factor does not equal said prescribed value;

in a third pass through the image,
applying a low pass filtering to the image in the vertical direction,
vertically downsampling the image to a prescribed degree, whenever the image was vertically upsampled, and
vertically shearing and scaling the image in a prescribed manner employing a vertical filtering; and in a fourth pass through the image,
applying a low pass filtering to the image in the horizontal direction, and
horizontally downsampling the image to a prescribed degree, whenever the image was horizontally upsampled.

2. The process of claim 1, wherein each pass through the image comprises establishing a transform matrix which accomplishes the process actions associated with the pass.

3. The process of claim 2, wherein the transform matrix is a 2D affine transform matrix A comprising a general form of $$A = \begin{bmatrix} a_{00} & a_{01} & t_0 \\ a_{10} & a_{11} & t_1 \\ 0 & 0 & 1 \end{bmatrix},$$

wherein $a_{00}$, $a_{01}$, $a_{10}$ and $a_{11}$ are prescribed shearing factors, and wherein $t_0$ and $t_1$ are prescribed translation factors.

4. The process of claim 3, wherein the process action of computing the vertical upsampling factor, comprises the actions of:

computing the maximum value of the original frequency associated with the image in the horizontal direction ($u_{max}$) that will appear in the resampled image; and
computing the maximum value of the original frequency associated with the image in the vertical direction ($v_{max}$) that will appear in the resampled image.

5. The process of claim 4, wherein the vertical upsampling factor is 3 or less.

6. The process of claim 4, wherein the process action of computing the vertical upsampling factor, further comprises the action of:
- computing a product of $v_{max}$ and an absolute cosine of the shearing factor $a_{11}$;
- designating the lesser of one, or the product of $v_{max}$ and an absolute cosine of the shearing factor $a_{11}$, as a minimum factor;
- computing a product of $u_{max}$ and an absolute cosine of the shearing factor $a_{01}$;
- computing a first sum as the minimum factor plus one;
- computing a second sum as the minimum factor plus the product of $u_{max}$ and an absolute cosine of the shearing factor $a_{01}$;
- designating the greater of the first or second sum as a maximum factor; and
- designating the vertical upsampling factor as being greater than or equal to the maximum factor with an upper limit of 3.

7. The process of claim 3, wherein the process actions of horizontally shearing and scaling the image, comprises an action of defining the 2D affine transform matrix A in the form of $$A = \begin{bmatrix} a_{00} & a_{01} & t_0 \\ a_{10} & a_{11} & t_1 \\ 0 & 0 & 1 \end{bmatrix} = \begin{bmatrix} b_0 & b_1 & t_2 \\ 0 & 1 & 0 \\ 0 & 0 & 1 \end{bmatrix} \begin{bmatrix} 1 & 0 & 0 \\ a_{10} & a_{11} & t_1 \\ 0 & 0 & 1 \end{bmatrix},$$

wherein $b_0 = a_{00} - a_{01}a_{10}/a_{11}$, $b_1 = a_{01}/a_{11}$, and $t_2 = t_0 - a_{01}t_1/a_{11}$.

8. The process of claim 7, wherein the process action of horizontally shearing and scaling the image, further comprises an action of initially transposing the matrix representing the image whenever the shearing factor $a_{11}$ approaches zero.

9. The process of claim 7, wherein the process action of horizontally shearing and scaling the image, further comprises, before shearing and scaling the image, the preliminary actions of:
- dividing the shearing factor $a_{00}$ by a first scalar $l_0$ to produce a first re-scaled factor $â_{00}$, wherein the first scalar $l_0 = \sqrt{a_{00}^2 + a_{01}^2}$;
- dividing the shearing factor $a_{01}$ by the first scalar $l_0$ to produce a second re-scaled factor $â_{01}$;
- dividing the shearing factor $a_{10}$ by a second scalar $l_1$ to produce a third re-scaled factor $â_{10}$, wherein the second scalar $l_1 = \sqrt{a_{10}^2 + a_{11}^2}$;
- dividing the shearing factor all by the second scalar $l_1$ to produce a fourth re-scaled factor $â_{11}$;
- computing an absolute cosine of each of the rescaled factors;
- determining if the sum of the absolute cosines of the first and fourth re-scaled factors is less than the sum of the absolute cosines of the second and third re-scaled factors;
- whenever the sum of the absolute cosines of the first and fourth re-scaled factors is less than the sum of the absolute cosines of the second and third re-scaled factors, transposing the matrix representing the image; and
- whenever the matrix representing the image is transposed, transposing the resulting resampled image.

10. The process of claim 4, wherein the process action of computing the horizontal upsampling factor, comprises an action of setting the horizontal upsampling factor to 3 or less.

11. The process of claim 4, wherein the process action of computing the horizontal upsampling factor, further comprises the action of:
- computing a product of $u_{max}$ and an absolute cosine of a combined shearing factor $b_0$, wherein $b_0 = a_{00} - a_{01}a_{10}/a_{11}$;
- designating the lesser of one, or the product of $u_{max}$ and the absolute cosine of the combined shearing factor $b_0$, as a minimum factor;
- computing a first sum as the minimum factor plus one;
- computing a second sum as the minimum factor plus the product of $v_{max}$, the vertical upsampling factor and the absolute cosine of the quotient of shearing factor $a_{10}$ divided by shearing factor $a_{11}$;
- designating the greater of the first or second sum as a maximum factor; and
- designating the horizontal upsampling factor as being greater than or equal to the maximum factor with an upper limit of 3.

12. A computer-implemented process for multi-pass resampling of a digital image, comprising using a computer to perform the following process actions:
- in a first pass through the image,
  - computing a horizontal upsampling factor representing the degree to which the image is to be upsampled in the horizontal direction, wherein the horizontal upsampling factor is set to a prescribed value whenever there is no substantial possibility of vertical aliasing during said resampling of the image, and
  - upsampling the image in the horizontal direction by said horizontal upsampling factor, whenever said horizontal upsampling factor does not equal said prescribed value;
- in a second pass through the image,
  - vertically shearing and scaling the image in a prescribed manner employing a vertical filtering,
  - computing a vertical upsampling factor representing the degree to which the image is to be upsampled in the vertical direction, wherein the vertical upsampling factor is set to a prescribed value whenever there is no substantial possibility of horizontal aliasing during said resampling of the image, and
  - upsampling the image in the vertical direction by said vertical upsampling factor, whenever said vertical upsampling factor does not equal said prescribed value;
- in a third pass through the image,
  - applying a low pass filtering to the image in the horizontal direction,
  - horizontally downsampling the image to a prescribed degree, whenever the image was horizontally upsampled, and
  - horizontally shearing and scaling the image in a prescribed manner employing a horizontal filtering; and
- in a fourth pass through the image,
  - applying a low pass filtering to the image in the vertical direction, and
  - vertically downsampling the image to a prescribed degree, whenever the image was vertically upsampled.

13. The process of claim 12, wherein each pass through the image comprises establishing a transform matrix which accomplishes the process actions associated with the pass.

14. The process of claim 13, wherein the transform matrix is a 2D affine transform matrix A comprising a general form of $$A = \begin{bmatrix} a_{00} & a_{01} & t_0 \\ a_{10} & a_{11} & t_1 \\ 0 & 0 & 1 \end{bmatrix},$$

wherein $a_{00}$, $a_{01}$, $a_{10}$ and $a_{11}$ are prescribed shearing factors, and wherein $t_0$ and $t_1$ are prescribed translation factors.

15. The process of claim 14, wherein the process action of vertically shearing and scaling the image, comprises an action of defining the 2D affine transform matrix A in the form of $$A = \begin{bmatrix} a_{00} & a_{01} & t_0 \\ a_{10} & a_{11} & t_1 \\ 0 & 0 & 1 \end{bmatrix} = \begin{bmatrix} b_0 & b_1 & t_2 \\ 0 & 1 & 0 \\ 0 & 0 & 1 \end{bmatrix} \begin{bmatrix} 1 & 0 & 0 \\ a_{10} & a_{11} & t_1 \\ 0 & 0 & 1 \end{bmatrix},$$

wherein $b_0 = a_{00} - a_{01}a_{10}/a_{11}$, $b_1 = a_{01}/a_{11}$, and $t_2 = t_0 - a_{01}t_1/a_{11}$.

16. The process of claim 15, wherein the process action of vertically shearing and scaling the image, further comprises an action of initially transposing the matrix representing the image whenever the shearing factor $a_{11}$ approaches zero.

17. The process of claim 15, wherein the process action of vertically shearing and scaling the image, further comprises, before shearing and scaling the image, the preliminary actions of:
dividing the shearing factor $a_{00}$ by a first scalar $l_0$ to produce a first re-scaled factor $\hat{a}_{00}$, wherein the first scalar $l_0 = \sqrt{a_{00}^2 + a_{01}^2}$;
dividing the shearing factor $a_{01}$ by the first scalar $l_0$ to produce a second re-scaled factor $\hat{a}_{01}$;
dividing the shearing factor $a_{10}$ by a second scalar $l_1$ to produce a third re-scaled factor $\hat{a}_{10}$, wherein the second scalar $l_1 = \sqrt{a_{10}^2 + a_{11}^2}$;
dividing the shearing factor $a_{11}$ by the second scalar $l_1$ to produce a fourth re-scaled factor $\hat{a}_{11}$;
computing an absolute cosine of each of the rescaled factors;
determining if the sum of the absolute cosines of the first and fourth re-scaled factors is less than the sum of the absolute cosines of the second and third re-scaled factors;
whenever the sum of the absolute cosines of the first and fourth re-scaled factors is less than the sum of the absolute cosines of the second and third re-scaled factors, transposing the matrix representing the image; and
whenever the matrix representing the image is transposed, transposing the resulting resampled image.

18. The process of claim 12, wherein the horizontal upsampling factor is 3 or less.

19. The process of claim 12, wherein the vertical upsampling factor is 3 or less.

20. A computer-implemented process for multi-pass resampling of a digital image which includes minification, comprising using a computer to perform the following process actions:
accessing a mipmap or ripmap comprising a sequence of images depicting the same scene as said digital image wherein the first image in the sequence exhibits a reduced level of detail in comparison to said digital image and each image in the sequence after the first exhibits a reduced level of detail in comparison to the preceding image in the series;
selecting the image from the accessed mipmap or ripmap which exhibits a level of detail closest to, but still greater than the level of detail desired to be exhibited in the resampled image;
in a first pass through the selected image,
computing a vertical upsampling factor representing the degree to which the selected image is to be upsampled in the vertical direction, wherein the vertical upsampling factor is set to a prescribed value whenever there is no substantial possibility of horizontal aliasing during said resampling of the image, and
upsampling the selected image in the vertical direction by said vertical upsampling factor, whenever said vertical upsampling factor does not equal said prescribed value;
in a second pass through the selected image,
horizontally shearing and scaling the selected image in a prescribed manner employing a horizontal filtering,
computing a horizontal upsampling factor representing the degree to which the selected image is to be upsampled in the horizontal direction, wherein the horizontal upsampling factor is set to a prescribed value whenever there is no substantial possibility of vertical aliasing during said resampling of the image, and
upsampling the selected image in the horizontal direction by said horizontal upsampling factor, whenever said horizontal upsampling factor does not equal said prescribed value;
in a third pass through the selected image,
applying a low pass filtering to the selected image in the vertical direction,
vertically downsampling the selected image to a prescribed degree, whenever the image was vertically upsampled, and
vertically shearing and scaling the selected image in a prescribed manner employing a vertical filtering; and
in a fourth pass through the selected image,
applying a low pass filtering to the selected image in the horizontal direction, and
horizontally downsampling the selected image to a prescribed degree, whenever the image was horizontally upsampled, and
designating the resulting image as the resampled image.

* * * * *